United States Patent
Brennan, III et al.

(10) Patent No.: US 6,728,444 B2
(45) Date of Patent: Apr. 27, 2004

(54) FABRICATION OF CHIRPED FIBER BRAGG GRATINGS OF ANY DESIRED BANDWIDTH USING FREQUENCY MODULATION

(75) Inventors: James F. Brennan, III, Austin, TX (US); Dwayne L. LaBrake, Cedar park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 196 days.

(21) Appl. No.: 10/066,524

(22) Filed: Jan. 31, 2002

(65) Prior Publication Data

US 2002/0122628 A1 Sep. 5, 2002

Related U.S. Application Data

(63) Continuation-in-part of application No. 09/161,944, filed on Sep. 28, 1998, now Pat. No. 6,404,956, which is a continuation-in-part of application No. 08/942,590, filed on Oct. 2, 1997, now Pat. No. 5,912,999.

(51) Int. Cl.$^7$ ................................................ G02B 6/34
(52) U.S. Cl. .................... 385/37; 385/123; 359/569
(58) Field of Search ............................ 385/10, 37, 123; 372/6, 96; 359/566, 569, 573, 577, 900, 130, 161

(56) References Cited

U.S. PATENT DOCUMENTS

| 5,066,133 A | 11/1991 | Brienza ................... 359/570 |
| 5,104,209 A | 4/1992 | Hill et al. .................... 385/27 |
| 5,104,590 A | 4/1992 | Hill et al. .................... 385/27 |
| 5,216,739 A | 6/1993 | Hill et al. .................. 385/123 |
| 5,327,515 A | 7/1994 | Anderson et al. ........... 385/123 |
| 5,388,173 A | 2/1995 | Glenn ....................... 385/37 |
| 5,499,134 A | 3/1996 | Calvanauskas et al. ...... 359/333 |
| 5,641,956 A | 6/1997 | Vengsarker et al. ... 250/227.14 |
| 5,745,615 A | 4/1998 | Atkins et al. .................. 385/37 |
| 6,174,648 B1 | 1/2001 | Terao et al. ................. 420/321 |
| 2002/0044358 A1 * | 4/2002 | Laming et al. ............. 359/570 |
| 2003/0006212 A1 * | 1/2003 | Segawa et al. ................ 216/12 |

FOREIGN PATENT DOCUMENTS

| EP | 0 254 509 | 1/1988 | ............ G02F/1/01 |
| EP | 0 793 123 A1 | 9/1997 | ............ G02B/6/16 |
| EP | 0 836 102 A2 | 4/1998 | ............ G02B/6/16 |
| EP | 0 840 146 A1 | 5/1998 | ............ G02B/6/16 |

(List continued on next page.)

OTHER PUBLICATIONS

B. Malo et al., "*Point-by-Point Fabrication of Micro-Bragg Gratings in Photosensitive Fibre using Single Excimer Pulse Refractive Index Modification Techniques*", in Electronics Letters, 2$^{nd}$ Sep. 1993, vol. 29, No. 18, pp. 1668–1669.

(List continued on next page.)

*Primary Examiner*—Hemang Sanghavi
(74) *Attorney, Agent, or Firm*—Gregg H. Rosenblatt

(57) ABSTRACT

A method for manufacturing an optical waveguide refractive index grating having a desired grating pitch Λ. The method includes the step of providing a photosensitive waveguide and a writing beam of actinic radiation, the writing beam having an intensity. The waveguide is translated relative to the writing beam at a velocity v(t). The intensity of the writing beam is modulated as a function of time at a frequency f(t), wherein $$\frac{v(t)}{f(t)} \approx \Lambda.$$

The step of modulating the intensity of the writing beam as a function of time f(t) at a frequency f(t) including the step of varying Λ.

18 Claims, 3 Drawing Sheets

FOREIGN PATENT DOCUMENTS

| EP | 0 843 186 A1 | 5/1998 | ............ G02B/6/16 |
|---|---|---|---|
| EP | 0 855 605 A2 | 7/1998 | ............ G02B/6/124 |
| EP | 0 978 738 A1 | 2/2000 | |
| GB | 2 316 760 A | 3/1998 | ............ G02B/6/00 |
| WO | WO97/22023 | 6/1997 | ............ G02B/6/16 |
| WO | WO97/26570 | 7/1997 | ............ G02B/6/16 |
| WO | WO 98/08120 | 2/1998 | ............ G02B/6/16 |
| WO | WO 00/02077 | 1/2000 | |

OTHER PUBLICATIONS

K. O. Hill et al., "*Birefringent Photosensitivity in Monomode Optical Fibre: Application to External Writing of Rocking Filters*", in Electronics Letters, $15^{th}$ Aug. 1991, vol. 27, No. 17, pp. 1548–1550.

K. O. Hill, et al., "*Efficient Mode Conversion in Telecommunication Fibre Using Externally Written Gratings*", in Electronics Letters, $2^{nd}$ Aug. 1990, vol. 26, No. 16, pp. 1270–1272.

L. A. Everall et al., "*Flexible Fabrication of Long–Period In–Fiber Gratings*", in CLEO '98, May 3–8, 1998, San Francisco, CA, *Friday Morning*, CFE2, pp. 513–514.

E. M. Dianov et al., "*Thermo–Induced Long–Period Fibre Gratings*", in ECOC 97, Sep. 22–25, 1997, Conference Publication No. 448, © IEE, 1997, pp. 53–56.

Ashish M. Vengsarkar et al., "*Long–Period Fiber Gratings as Band–Rejection Filters*", Optical Fiber Communication, OFC '95, pp. PD4–1–PD4–5.

Ashish M. Vengsarkar et al., "*Long–Period Fiber Gratings as Band–Rejection Filters*", Journal of Lightwave Technology, vol. 14, No. 1, Jan. 1996, pp. 58–65.

D. Garth, et al., "*System Performance of Practical Broadband Dispersion–Compensating Gratings*", OFC '98 Technical Digest, Tuesday Afternoon, pp. 74–75.

Nortel, Northern Telecom, "*Dispersion Compensating Fibre Grating Module*", DCG Series, Issue: Mar. 2, 1998, Optoelectronics Catalog, pp. PB0030–31.

Vikram Bhatia et al., "*Long–Period Fiber Grating Sensors*", in Optical Fiber Communication, OFC'96, Technical Digest, vol. 2, pp. 265–266.

A. M. Vengsarkar et al., "*Long–Period Fiber Gratings as Gain–Flattening and Laser Stabilizing Devices*", Conf. on Integrated Optics and Optical Fibre Communication, Technical Digest, vol. 5, Post–deadline Papers, PD–1–2, pp. 3–4.

A. M. Vengsarkar et al., "*Long–Period Fiber–Grating–Based Gain Equalizers*" Optics Letters, vol. 21, No. 5, Mar. 1, 1996, pp. 336–338.

D. D. Davis et al., "*$CO_2$ Laser–Induced Long–Period Fibre Gratings: Spectral Characteristics, Cladding Modes and Polarisation Independence*", Electronics Letters, $9^{th}$ Jul. 1998, vol. 34, No. 14, pp. 1416–1417.

J. R. Qian and H. F. Chen, "*Gain Flattening Fibre Filters Using Phase–Shifted Long Period Fibre Gratings*", Electronics Letters, $28^{th}$ May 1998, vol. 34, No. 11, pp. 1132–1133.

L. Dong et al., "*Long Period gratings Formed in Depressed Cladding Fibres*", Electronics Letters, $23^{rd}$ Oct. 1997, vol. 33, No. 22, pp. 1897–1898.

V. Bhatia and A. M. Vengsarkar, "*Optical Fiber Long–Period Grating Sensors*", Optics Letters, May 1, 1996, vol. 21, No. 9,.

Lawrence R. Chen, et a., "*Ultrashort Plse Reflection from Fiber Gratings: A Numerical Investigation*", IEEE, vol. 15, No. 8, Aug. 1997, p. 1502–1512.

\* cited by examiner

FABRICATION OF CHIRPED FIBER BRAGG GRATINGS OF ANY DESIRED BANDWIDTH USING FREQUENCY MODULATION

RELATED APPLICATIONS

The present application is a continuation-in-part of U.S. application Ser. No. 09/161,944, entitled "Long-Length Continuous Phase Bragg Reflectors In Optical Media", filed Sep. 28, 1998, now U.S. Pat. No. 6,408,756 which is a continuation-in-part of U.S. application Ser. No. 08/942,590, issued as U.S. Pat. No. 5,912,999, entitled "Method For Fabrication Of In-Line Optical Waveguide Refractive Index Gratings Of Any Length", filed Oct. 2, 1997, both of which are incorporated herein by reference.

FIELD OF THE INVENTION

The present invention relates to a method for making in-line optical waveguide refractive index gratings of any desired length and articles manufactured utilizing this method. More specifically, the present is directed to a method for making a fiber Bragg grating (FBG) of any length by translating a fiber with respect to an interferogram of actinic radiation with a pitch that is frequency modulated as a function of time and to long-length continuous-phase Bragg gratings manufactured using this technique.

BACKGROUND OF THE INVENTION

In-line optical waveguide refractive index gratings are periodic, aperiodic or pseudo-periodic variations in the refractive index of a waveguide. Gratings may be formed, for example, by physically impressing a modulation on the waveguide, by causing a variation of the refractive index along the waveguide using the photosensitivity phenomenon, or by other methods known in the art. In particular, gratings written into the core of an optical fiber are critical components for many applications in fiber-optic communication and sensor systems.

Dopants, such as germanium, are added to an area of the waveguide material to make it photosensitive, causing the refractive index of that region to be susceptible to increase upon exposure to actinic radiation. The currently preferred method of "writing" an in-line grating comprises exposing a portion of the waveguide to the interference between two beams of actinic (typically UV) radiation. The two beams are incident on the guiding structure of the waveguide in a transverse direction to create an interferogram, that is, a pattern of optical interference. The angle between the two beams (and the wavelength of the radiation) defines the fringe spacing of the interferogram. Typically, the two beams of actinic radiation are the legs of an interferometer or are produced by launching a single beam through a phase mask. The phase mask method is considered generally more suitable for large scale manufacture of in-line gratings, because it is highly repeatable, less susceptible to mechanical vibrations of the optical setup, and can be made with writing beams of much shorter coherence length.

Advantages of optical fiber in-line gratings over competing technologies include all-fiber geometry, low insertion loss, high return loss or extinction, and potentially low cost. But one of the most distinguishing features of fiber gratings is the flexibility the gratings offer for achieving desired spectral characteristics. Numerous physical parameters of the gratings can be varied, including induced index change, length, apodization, period chirp, grating pitch tilt, and whether the grating supports coupling into co-propagating (long-period or transmission gratings) or counter-propagating coupling (Bragg gratings) at a desired wavelength. By varying these parameters, gratings can be tailored for specific applications.

The versatility of an in-line grating is largely dependent on two factors, the overall length of the grating structure and the reflectivity (or transmission) profile of the grating structure itself. Intricate reflectivity profiles can be achieved by carefully controlling the refractive index perturbation along the waveguide length, x. The index perturbation $\partial n(x)$ may be characterized as a phase and amplitude-modulated periodic function, $$\partial n_{(x)} = \partial n_{0(x)} \cdot \left\{ A_{(x)} + m_{(x)} \cdot \cos\left[\frac{2\pi}{\Lambda} \cdot x + \phi_{(x)}\right] \right\}, \quad (1)$$

where $\partial n_0(x)$ is the "dc" index change spatially averaged over a grating period, $A(z)$ is an offset (typically $A=1$), $m(x)$ is the fringe visibility of the index change, $\Lambda$ is the nominal period and $\phi(x)$ describes grating chirp. To automate the fabrication process, it is desirable to write this arbitrary refractive index profile into a waveguide in a single process step, i.e., with a single pass of the laser beam over the waveguide and without physically changing the writing apparatus. For full flexibility in grating manufacture, one needs to control independently each of the parameters describing $\partial n(x)$.

In particular, apodization of a grating spectrum may be achieved by controlling say $\partial n_0$ (and $m(x)$ along the grating length. The main peak in the reflection spectrum of a finite length in-line grating with uniform modulation of the index of refraction is accompanied by a series of sidelobes at adjacent wavelengths. Lowering the reflectivity of the sidelobes, or "apodizing" the reflection spectrum of the grating, is desirable in devices where high rejection of nonresonant light is required. Apodization also improves the dispersion compensation characteristics of chirped gratings. In most of these applications, one desires apodization created by keeping $\partial n_0(x)$ and $A(x)$ constant across the grating length while $m(x)$ is varied, which is believed not to have been achieved (with full flexibility) in a single-step process by controlling only the laser beam.

Variation of the index modulation by changing the ultraviolet exposure along the length of the grating causes both the magnitude of the refractive index modulation and the average photoinduced refractive index to vary. The average index variation leads to undesirable effective chirps of the resonant wavelength of the grating and widens the grating spectral response. To alleviate these symptoms, it is desirable to "pure apodize" the grating, that is, to generate both the non-uniform modulated ultraviolet fringe pattern and a compensating exposure which automatically ensures that the average photoinduced refractive index is constant along the length of the fiber. Some researchers have created the desired apodization profile by dithering the waveguide in the interferogram to decrease refractive index fringe visibility at specified locations along the waveguide length, but these techniques require complex mechanical fixtures for the phase mask and waveguide that can be vibrated yet precisely positioned.

In addition to the specific index perturbation written into the waveguide, grating length is also important in certain applications in optical fiber communication and distributed sensor systems. For instance, long-length chirped fiber Bragg gratings have been suggested as attractive devices for the manufacture of dispersion compensators. High-speed, long distance data transmissions, especially transmissions over existing non-dispersion shifted fiber networks, are limited by chromatic dispersion in the optical fiber. Since the transmission bandwidth usually is predetermined by the needs of the system, to be usable as dispersion compensators in practice, chirped Bragg gratings need to exhibit dispersion compensation over a bandwidth large enough to cover typical semiconductor laser wavelength tolerances It has been reported that a grating of the order of 1 meter in length with a constant dispersion profile and a broad bandwidth would be required to achieve a time delay of ~1700 ps/nm sufficient to compensate for 100 km of non-dispersion shifted fiber over 5 nm at a wavelength of 1550 nm.

The need exists for a method for producing long length Bragg gratings having complex grating structures. One method has been described where a UV-beam is scanned over a long phase mask having a fixed position relative to the fiber. Complex structures are added by varying the exposure time or by postprocessing the grating. Another method discusses the use of fibers held in a fixed position relative to specially designed long phase masks having the complex structure already imprinted in the mask. However, both of these techniques are limited by the length of available phase masks, usually about ~10 cm.

A method for writing gratings where the waveguide moves in relation to the mask has been suggested. However, this technique is limited, since the fringe visibility of the index modulation in the waveguide will decrease significantly if the waveguide moves relative to the phase mask too much, so gratings much larger than a phase mask cannot be made. Recent developments have attempted to produce long complex gratings by scanning a UV-beam over a phase mask and writing sub-gratings (a number of grating elements) at every irradiation step on the fiber while moving the fiber using a very precise piezoelectric transducer. To increase the size of the grating structure, a number of subgratings may then be concatenated to one another. The fiber is translated with high-precision staging relative to an interferogram of UV-light. The position of the stage is tracked interferometrically and the laser is triggered when the fiber reaches the desired position for the next irradiation. The phasing between these subgratings may be controlled to create some complex structures, such as chirps. Apodization may be achieved by dithering about an interferogram/fiber relative position.

The concatenation process suffers from needing extremely accurate positioning staging, which is currently available only by using an interferometer as an encoder. Without interferometric control, the concatenation methods suffers from "stitching" errors, i.e., errors in the matching of the grating elements. Presently only linear motion staging can be interoferometrically controlled; rotary stages must use mechanically-ruled encoders. Therefore, the length of a fiber grating made with a concatenation process is limited by the linear travel available on precision stages, the implementation of which currently become prohibitively expensive if much longer than one meter. Since the protective housing around a fiber must be removed for grating fabrication, a long length of bare fiber containing the grating is removed from the precision staging and coiled for packaging, which increases fabrication complexity (increased handling), complicates manufacture automation, and is likely to reduce the mechanical strength of the fiber.

The need remains for an effective writing technique for very long length in-line optical waveguide gratings having complicated reflectivity profiles.

SUMMARY OF THE INVENTION

The present invention is directed to a method for manufacturing an optical waveguide refractive index grating having a desired grating pitch $\Lambda$. The method includes the step of providing a photosensitive waveguide. The waveguide may be a photosensitive optical fiber and the grating may be a continuous refractive index perturbation. The waveguide is translated at a velocity v(t) relative to a writing beam of actinic radiation having an intensity The step of translating included placing the waveguide on a rotary stage.

The intensity of the writing beam is modulated as a function of time at a frequency f(t), wherein $$\frac{v(t)}{f(t)} \approx \Lambda.$$

The step of modulating the intensity of the writing beam as a function of time at a frequency f(t) comprises the step of varying $\Lambda$.

The method of may further include the steps of translating a chirped phase mask through the writing beam to create an interferogram of a changing period $\Lambda(t)$, where $$\Lambda(t) = \Lambda_s + \frac{d\Lambda}{dt} \cdot t,$$

where $\Lambda_S$ is a starting period and where the step of modulating the intensity of the writing beam by varying of $\Lambda$ wherein, $$f(t) = \frac{v}{\Lambda_s + \frac{d\Lambda}{dt} \cdot t}$$

to maintain a resonance condition.

The method also may include the step of providing a writing beam comprising providing a writing beam having a peak intensity illuminating the fiber $I_0$ and a width D, wherein the fluence $\Phi(x)$ delivered to the waveguide is determined by the equation $$\Phi(x) \approx \frac{I_{0(x)}}{4} \cdot \frac{D}{v_{(x)}} \cdot \left\{ A_{(x)} - \frac{m_{(x)}}{2} \cdot \cos\left[\frac{\omega_{(x)}}{v_{(x)}} \cdot x\right] \right\},$$

wherein A is an offset and m is fringe visibility.

The varying-period interferogram may be produced using a tunable interferometer. The index perturbation may have a changing periodicity along the length of the grating.

A long-length phase continuous Bragg grating may be manufactured using the method described above. In some embodiments, the grating may be chirped. Embodiments of such grating may have a length of at least 2.5 meters or even greater than four meters.

Optical components such as an optical dispersion compensator, a broadband light generator, a rapid spectral interrogator, and a sensor may be manufactured including the grating(s) described herein.

DETAILED DESCRIPTION OF THE INVENTION

Figure 1:
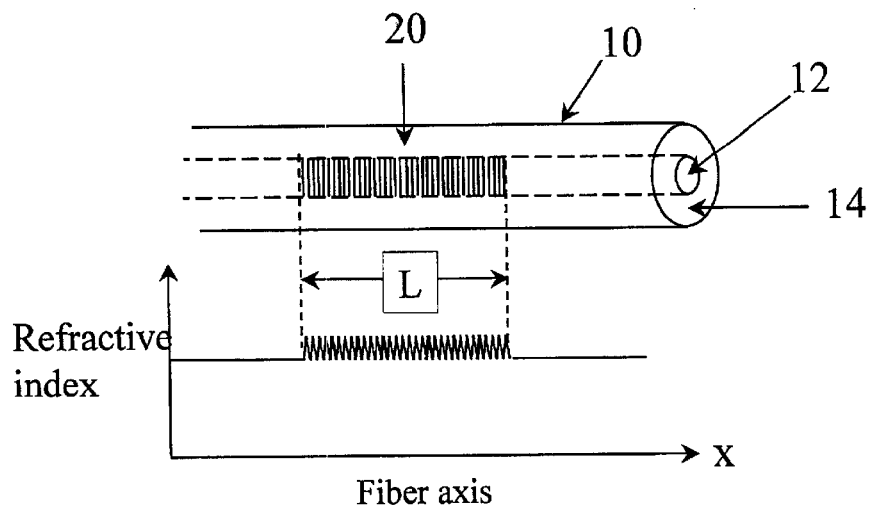
FIG. 1 is a simplified schematic representation of a fiber Bragg grating including a possible refractive index profile.

An optical fiber 10 having a grating 20 of length L is illustrated in FIG. 1. The fiber 10 usually comprises silica, although other embodiments known in the art may comprise plastic compounds. The optical fiber 10 includes a core 12 and one or more claddings 14. The grating 20 is a series of periodic, aperiodic or pseudo-periodic variations on the core 12 and/or one or more of the claddings 14 of the fiber. As illustrated in the matched plot shown in FIG. 1, the grating 20 consists of variations in the refractive index of the fiber 10.

Commonly-owned, U.S. application Ser. No. 09/191,644, entitled "Long-Length Continuous Phase Bragg Reflectors In Optical Media", and in U.S. Pat. No. 5,912,999, entitled "Method For Fabrication Of In-Line Optical Waveguide Refractive Index Gratings Of Any Length", both of which are incorporated herein by reference, describe a method to fabricate fiber Bragg gratings (FBGs) of virtually any length.

In this method, a fiber is translated at a velocity v past a stationary interferogram through which propagates a laser beam of intensity $I_0$ that is amplitude-modulated as a function of time at radial frequency $\omega$. If the diameter of the beam D is much larger than the period of the interferogram $2\Lambda$, the energy per unit area delivered to the fiber core may be expressed as $$\Phi(x) \approx \frac{I_0}{4} \cdot \frac{D}{v} \cdot \left\{ 1 - \frac{1}{2}\text{sinc}\left[D \cdot \left(\frac{2\pi}{\Lambda} \pm \frac{\omega}{v}\right)\right] \cdot \cos\left[\pm \frac{\omega}{v} \cdot x - D \cdot \left(\frac{2\pi}{\Lambda} \pm \frac{\omega}{v}\right)\right]\right\} \quad (1)$$

Further study of equation (1) with an understanding of the process has shown that the second term in the curly brackets in (1) (which is actually two terms) contains a tuning parameter:

$$\frac{2\pi}{\Lambda} \pm \frac{\omega}{v}$$

whereby if $$\frac{v}{f} \approx \Lambda$$

where $\omega = 2\pi f$, then $$\Phi(x) \approx \frac{I_0}{4} \cdot \frac{D}{v} \cdot \left\{1 - \frac{1}{2} \cdot \cos\left[\frac{\omega}{v} \cdot x\right]\right\} \quad (2)$$

This shows the ability to manufacture a chirped FBG of any length by slightly detuning the frequency of the light amplitude modulation or changing the velocity of the fiber. As the frequency of the light modulation or the velocity of the fiber is changed, the tuning parameter in the sinc function of (1) will increase from zero and cause the amplitude of the cosine-function spatial-modulation to decrease. If the modulation frequency or fiber velocity is detuned too much from the resonance condition, no net modulation will result.

This amplitude decrease is proportional to the diameter of the laser beam, which may be focused to make wide wavelength chirps possible. A 4 nm chirped FBG may be written with a beam diameter less than ~100 $\mu$m.

A desirable dispersion compensator for optical communication networks should cover the full $Er^+$-doped fiber optical amplifier range, which can be greater than 40 nm. Using the method described above, a 40 nm chirp may be written into a single FBG with a laser beam diameter less than ~10 $\mu$m, by keeping the argument in the sinc function in (1) less than $\pi$.

However, although wide chirps are possible by focusing the writing beam to a small diameter, the visibility of the FBG index modulation varies over the grating bandwidth and thus so does its reflection profile. This variation may cause the signal loss to differ between wavelength channels, creating system management problems. Since the refractive index perturbation scales nonlinearly with delivered UV radiation dose, one may saturate the fiber photosensitivity by applying large UV does across the fiber and thereby create a seemingly uniform index visibility across a wide wavelength range. But exposing the fiber to excessive levels of UV radiation increases the optical loss and cladding mode coupling, which degrades device utility.

Furthermore, tightly focused laser beams are difficult to handle and require demanding alignment procedures. The need exists to create wide bandwidth FBGs with constant device fringe visibility along their length.

In the method of the present invention, the period of the interferogram is varied as a function of time and the frequency of the light modulation is varied synchronously as $$\frac{v}{f(t)} = \Lambda(t),$$

so that the argument in the sinc function of (1) will remain equal to zero.

When a chirped phase mask is translated through the writing beam to create an interferogram of changing period $$\Lambda(t) = \Lambda_s + \frac{d\Lambda}{dt} \cdot t,$$

where $\Lambda_S$ is its starting period, then the beam intensity would be modulated at $$f(t) = \frac{v(t)}{\Lambda_s + \frac{d\Lambda}{dt} \cdot t}$$

to maintain the resonance condition.

Figure 2:
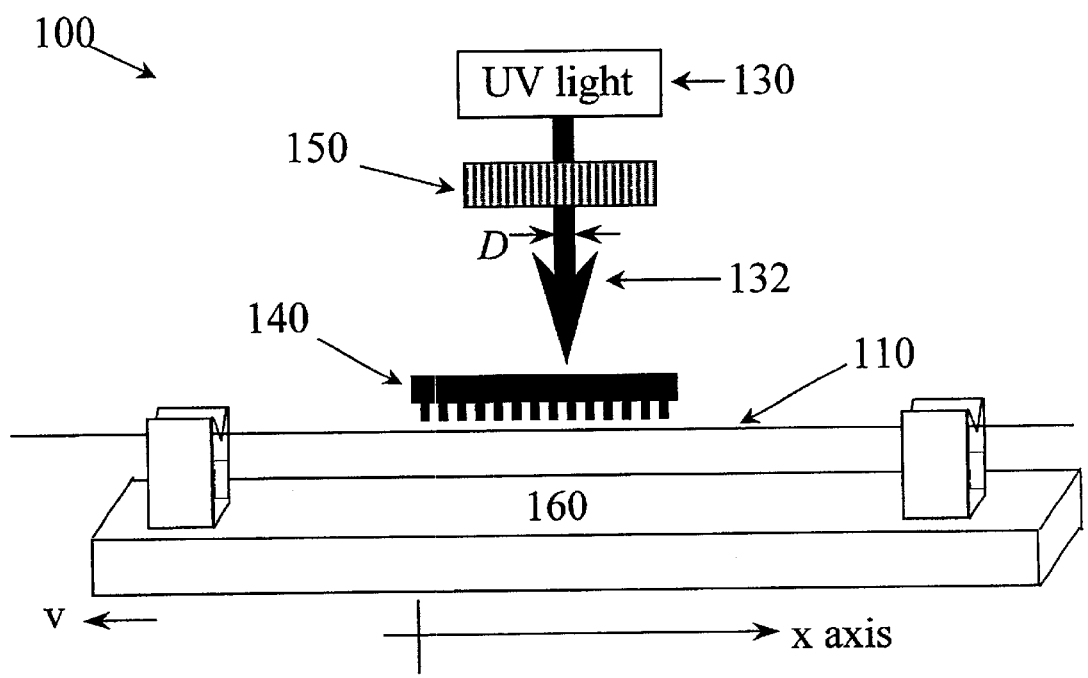
FIG. 2 is a simplified schematic representation of an in-line optical waveguide refractive index writing assembly, writing fiber gratings in accordance with the present invention.

FIG. 2 schematically illustrates an index writing assembly 100 using the writing method of the present invention. The index writing assembly 100 includes a source of light 130 producing a beam 132., an interference pattern generator 140, a modulator 150, and a fiber holding assembly 160 used to hold a fiber 110. More than one waveguide may be placed and translated simultaneously in the index writing assembly. Germanium or other photosensitive dopants are added to the silica glass of a region of the fiber 110, making the refractive index of that region of the optical fiber susceptible to change, generally an increase, upon exposure to actinic radiation. Commercially available photosensitive fibers, such as Corning® SMF-28™ CPC6 (Corning Incorporated, Corning, N.Y.), may be used. As those skilled in the art may appreciate, the method of the present invention also may be used to modify the refractive index not only of optical fibers, but also of other waveguides, such as planar waveguides.

The light source 130 is a source of actinic radiation, such as a UV laser light or X-ray radiation. The source of light is selected to deliver a beam of sufficient intensity and having a sufficiently narrow diameter to write the desired grating. Other sources of light known in the art may be used depending on the type of fiber used and the desired grating pattern. The source of light 130 produces a beam 132 having a peak intensity of $I_0$ and a diameter D.

The interference pattern generator 140 creates an intensity distribution of period Λ and is positioned between the fiber 110 and the source of light 130. The period of the intensity distribution generally matches the desired grating pitch. An intensity distribution is a spatially varying repeating light intensity pattern, which can be periodic or quasi-periodic, such as, for example, an interferogram. The interference pattern generator 140 is a phase mask of period 2Λ, such as a Lasirus PM-248-1.078-25.4 (Lasirus Inc., Saint-Laurent, Québec, Canada) of period 1.078 μm which creates an interferogram of period 0.539 μm. The interferogram may be produced by other methods, such as an interferometer. Alternatively, as one skilled in the art may appreciate, the periodic (or quasi-periodic) intensity distribution of actinic radiation used to fabricate a grating, need not necessarily be obtained by constructing an interferogram. For instance, an image reduction system utilizing amplitude masks may be used to create the intensity distribution.

Figure 3:
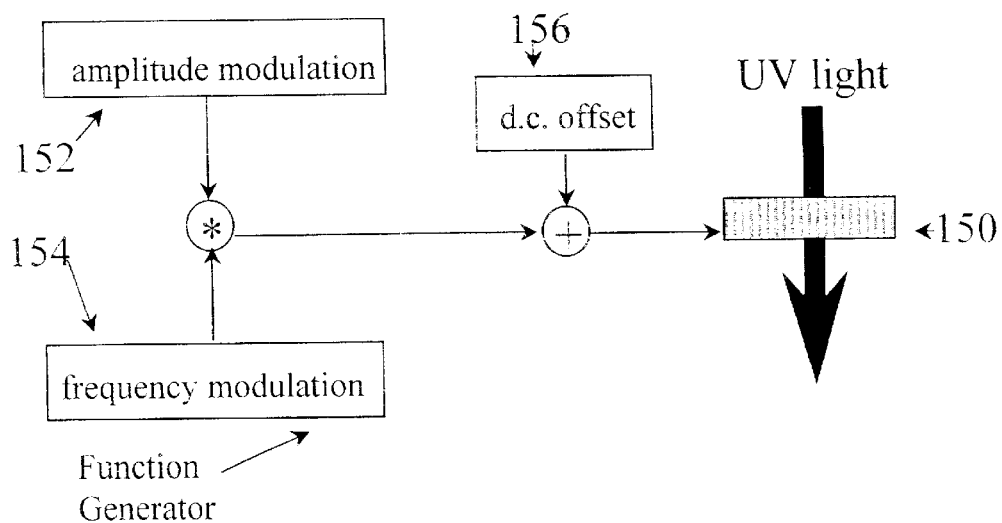
FIG. 3 is a simplified schematic representation of a refractive index envelope modulation in-line optical waveguide refractive index writing assembly, writing fiber gratings in accordance with the present invention.

FIG. 3 illustrates schematically one embodiment of the electronic signal controls of modulator 150. The electronic signal controls of modulator 150 include an amplitude modulation function 152, a frequency modulation function 154 and a d.c. offset 156. A variety of modulators may be used, such as an opto-acoustic modulator (for example, IntraAction ASM-1251LA3 from IntraAction, Bellwood, Ill.). The modulator 150, amplitude modulates the beam 132 at a frequency f(t). In addition, as illustrated in FIG. 3, the electronic signal that controls the modulator may be shaped by a function generator, such as a Stanford Research Systems DSM345 (Stanford Research Systems, Sunnyvale, Calif.), to tailor the index perturbation profile along the fiber length to cause chirp and apodization in the resulting grating.

The fiber 110 is translated at a velocity v(t) relative to the intensity distribution. More than one waveguide may be translated simultaneously through the periodic intensity distribution.

A laser beam that is amplitude-modulated as a function of time and a phase mask is used to create FBGs of any desired length. In the present example, the fiber 110 is translated at a precise velocity v(t) past a stationary phase mask 140 through which propagates the laser beam 132 that is amplitude-modulated at a radial frequency ω(ω=2π·f), where, $$\frac{f(t)}{v(t)} \approx \frac{1}{\Lambda}.$$

Depending on the writing assembly and the desired profile, both f(t) and v(t) may be variable functions, or either or both could be constants. Of course, the term constant is defined within the acceptable parameters for deviations in the fiber grating pitch (δΛ) due to jitter or error, as explained below.

The movement of the fiber 110 in relation to the intensity distribution is controlled precisely by a translation mechanism. The fiber 110 is mounted on the fiber holding assembly 160, a very precise velocity-controlled motion stage which may be a rotary or linear stage. In an alternative embodiment, illustrated in FIG. 4, a continuous length of fiber is spooled in a spool 170 and the position of the writing beam is tracked to stay on the fiber as the spool rotates. The movement of the stage or the spool is coupled to act in synchrony with the modulator, $$\frac{v(t)}{f(t)} \approx \Lambda.$$

In yet other alternative embodiments, the translation mechanism may control the movement of the source of light 130 and of the interferogram generator 140.

Figure 4:
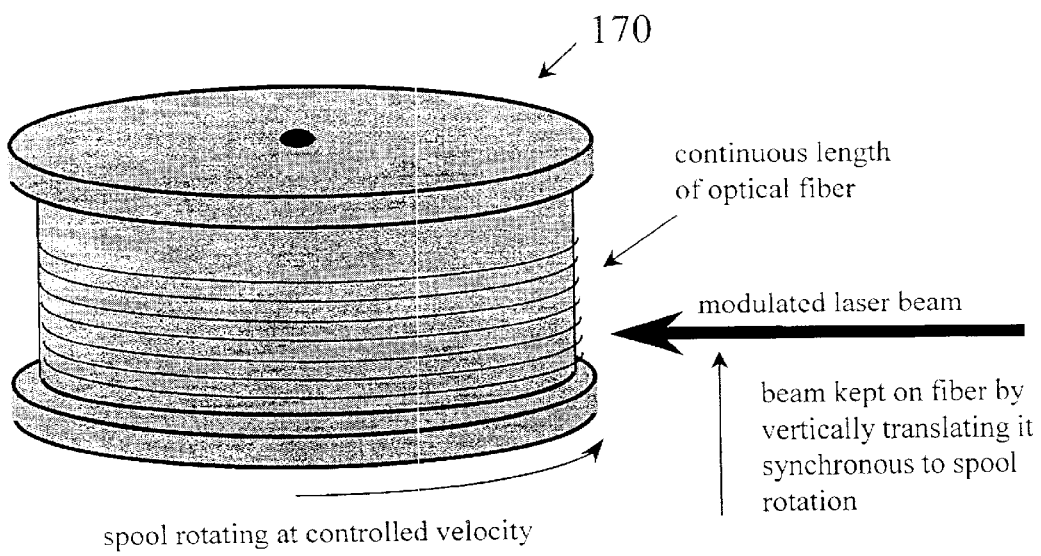
FIG. 4 is a simplified representation of an embodiment of the present invention where the fiber is drawn by a spool.

To manufacture a grating longer than the range of travel of precision motion stages, one may translate the fiber through the interferogram in a web-drive system. The fiber could be placed into V-grooves, or precision V-groove pulleys, similar to those used in the fiber holding assembly 160 illustrated in FIG. 2 to maintain precise alignment of the fiber with the interference pattern. Since the method of the present invention requires velocity control, as opposed to precise positioning, the fiber may be rolled onto spools 170, as illustrated in FIG. 4, which rotate to translate a continuous length of fiber 172 in front of an interferogram created by a phase mask from a modulated laser beam 174. The spool 170 is part of a spool to spool system The rotational speed of these spools is achieved with a spindle motor controlled by simple phase-lock-loop circuitry 176 to provide precise rim velocities. As illustrated in FIG. 4, the beam 174 is kept on the fiber 172 by vertically translating the beam 174 sychronous to the rotation of the spool 170. The position of the writing beam 174 may be tracked, such as with a laser beam, to stay on the fiber 172 as the spool rotates.

In an alternative embodiment of this invention, the uncoated fiber may be affixed to the spool, and the spool with the grating may be packaged, thereby reducing fiber handling.

Figure 5:
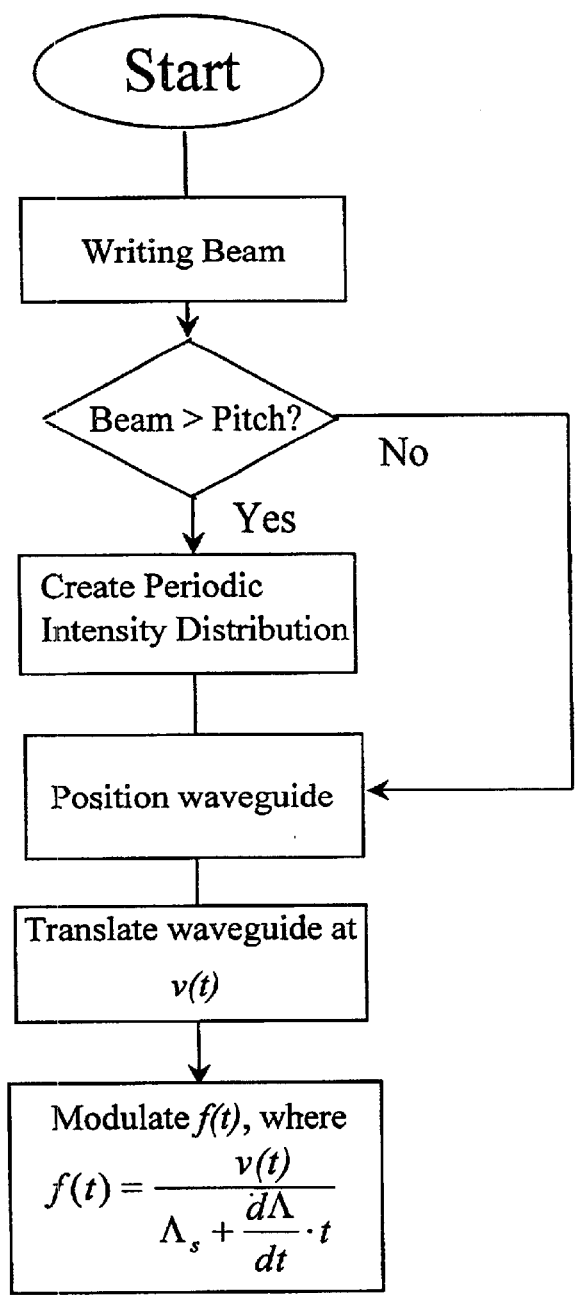
FIG. 5 is a flow diagram of an embodiment of the method of the present invention.

FIG. 5 is a flow diagram of a method for manufacturing in-line optical waveguide refractive index gratings of virtually any length in accordance with the present invention. A writing beam of actinic radiation is provided. If the beam is smaller that the desired grating pitch, then no interference pattern generator is necessary, otherwise a periodic intensity distribution of period Λ is created from the writing beam. A photosensitive waveguide is provided and placed across the path of the writing beam. Then, the waveguide is translated relative to the writing beam at a velocity v(t). The intensity of the writing beam as a function of time is modulated at a frequency f(t), wherein $$\frac{v(t)}{f(t)} \approx \Lambda.$$

If apodized gratings are desired, the intensity of the writing beam may be varied further to control the envelope of the refractive index perturbation.

The method of the present invention offers the ability to write in-line optical waveguide refractive index gratings of virtually any length with complicated refractive index profiles. As those skilled in the art may appreciate, the inventive method disclosed in the present document can be used to modify the refractive index not only of optical fiber, but also of planar waveguides.

Those skilled in the art will recognize that varying-period interferograms can be produced in several ways, such as with chirped phase masks or tunable interferometers. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for manufacturing an optical waveguide refractive index grating having a desired grating pitch Λ, the method comprising the steps of:

providing a photosensitive waveguide;

providing a writing beam of actinic radiation, the writing beam having an intensity;

translating the waveguide relative to the writing beam at a velocity v(t);

modulating the intensity of the writing beam as a function of time at a frequency f(t), wherein $$\frac{v(t)}{f(t)} \approx \Lambda;$$

the step of modulating the intensity of the writing beam as a function of time at a frequency f(t) comprising the step of varying Λ.

2. The method of claim 1, including the steps of translating a chirped phase mask through the writing beam to create an interferogram of a changing period Λ(t), where $$\Lambda(t) = \Lambda_s + \frac{d\Lambda}{dt} \cdot t,$$

where $\Lambda_S$ is a starting period;

the step of modulating the intensity of the writing beam by varying of Λ wherein, $$f(t) = \frac{v}{\Lambda_s + \frac{d\Lambda}{dt} \cdot t}$$

to maintain a resonance condition.

3. The method of claim 1, the step of providing a writing beam comprising providing a writing beam having a peak intensity illuminating the fiber $I_0$ and a width D, wherein the fluence Φ(x) delivered to the waveguide is determined by the equation $$\Phi(x) \approx \frac{I_0(x)}{4} \cdot \frac{D}{v_{(x)}} \cdot \left\{ A_{(x)} - \frac{m_{(x)}}{2} \cdot \cos\left[\frac{\omega_{(x)}}{v_{(x)}} \cdot x\right] \right\},$$

wherein A is an offset and m is fringe visibility.

4. The method of claim 1, wherein the varying-period interferogram is produced using a tunable interferometer.

5. A long-length phase continuous Bragg grating manufactured in accordance with the method of claim 1.

6. The grating of claim 5, the grating having a length of at least 2.5 meters.

7. The grating of claim 5, wherein the grating has a length of at least four meters.

8. The grating of claim 5, wherein the grating is a continuous phase Bragg grating.

9. The grating of claim 5, wherein the waveguide is a photosensitive optical fiber and the grating is a continuous refractive index perturbation.

10. The grating of claim 5, wherein the index perturbation has a changing periodicity along the length of the grating.

11. The grating of claim 5, wherein the step of translating included placing the waveguide on a rotary stage.

12. The grating of claim 5, where in the grating is chirped.

13. An optical dispersion compensator comprising the grating of claim 5.

14. A broadband light generator comprising the grating of claim 5.

15. A rapid spectral interrogator comprising the grating of claim 5.

16. A sensor comprising the grating of claim 5.

17. A method for writing a refractive index grating having a desired grating pitch Λ on an optical waveguide, the method comprising the steps of:

providing a writing beam of actinic radiation;

translating the waveguide relative to the writing beam at a velocity v(t);

modulating the intensity of the writing beam as a function of time at a frequency f(t), wherein $$\frac{v(t)}{f(t)} \approx \Lambda;$$

the step of modulating the intensity of the writing beam as a function of time at a frequency f(t) comprising the step of varying Λ.

18. A grating manufactured in accordance with the method of claim 17.

* * * * *

UNITED STATES PATENT AND TRADEMARK OFFICE
CERTIFICATE OF CORRECTION

PATENT NO. : 6,728,444 B2
DATED : April 27, 2004
INVENTOR(S) : Brennan III, James F.

It is certified that error appears in the above-identified patent and that said Letters Patent is hereby corrected as shown below:

Title page,
Item [57], ABSTRACT,
Line 11, after "a function of time" delete the first occurrence of "f(t)".

Column 2,
Line 19, delete "A" and insert -- $\Lambda$ -- therefor.
Line 29, delete "$\partial n_0$(" and insert -- $\partial n_0(x)$ -- therefor.

Column 3,
Line 7, after "tolerances" insert -- . --.

Column 4,
Line 6, after "intensity" insert -- . --.

Column 6,
Line 59, after "132" delete ".".

Column 7,
Lines 1 and 2, "Coming" and insert -- Corning -- therefor.
Line 14, delete "A" and insert -- $\Lambda$ -- therefor.

Signed and Sealed this

Sixteenth Day of November, 2004

JON W. DUDAS
*Director of the United States Patent and Trademark Office*